(12) United States Patent
Trinh et al.

(10) Patent No.: US 8,215,384 B2
(45) Date of Patent: Jul. 10, 2012

(54) BIT BASED FORMATION EVALUATION AND DRILL BIT AND DRILL STRING ANALYSIS USING AN ACOUSTIC SENSOR

(75) Inventors: Tu Tien Trinh, Houston, TX (US); Eric Sullivan, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 51 days.

(21) Appl. No.: 12/268,173

(22) Filed: Nov. 10, 2008

(65) Prior Publication Data

US 2010/0118657 A1    May 13, 2010

(51) Int. Cl.
*G01V 1/44* (2006.01)
*E21B 47/00* (2012.01)

(52) U.S. Cl. .................... 166/177.1; 175/50

(58) Field of Classification Search ............... 166/255.2, 166/177.1, 177.2; 175/50; 367/81, 83; 181/108, 181/112, 122
See application file for complete search history.

(56) References Cited

U.S. PATENT DOCUMENTS

| | | | |
|---|---|---|---|
| 5,144,589 A * | 9/1992 | Hardage ............ | 367/25 |
| 5,415,030 A | 5/1995 | Jogi et al. | |
| 5,448,227 A | 9/1995 | Orban et al. | |
| 5,475,309 A | 12/1995 | Hong et al. | |
| 5,720,355 A | 2/1998 | Lamine et al. | |
| 5,798,488 A | 8/1998 | Beresford et al. | |
| 6,057,784 A | 5/2000 | Schaaf et al. | |
| 6,150,822 A | 11/2000 | Hong et al. | |
| 6,230,822 B1 | 5/2001 | Sullivan et al. | |
| 6,419,032 B1 | 7/2002 | Sullivan et al. | |
| 6,429,431 B1 | 8/2002 | Wilk | |
| 6,510,389 B1 * | 1/2003 | Winkler et al. ............ | 702/6 |
| 6,516,898 B1 | 2/2003 | Krueger | |
| 6,540,033 B1 | 4/2003 | Sullivan et al. | |
| 6,543,312 B2 | 4/2003 | Sullivan et al. | |
| 6,564,883 B2 | 5/2003 | Fredericks et al. | |
| 6,571,886 B1 | 6/2003 | Sullivan et al. | |
| 6,626,251 B1 | 9/2003 | Sullivan et al. | |
| 6,681,633 B2 | 1/2004 | Schultz et al. | |
| 6,769,497 B2 | 8/2004 | Dubinsky et al. | |
| 6,796,746 B2 | 9/2004 | Jessmore et al. | |
| 6,850,068 B2 | 2/2005 | Chemali et al. | |
| 7,046,165 B2 | 5/2006 | Beique et al. | |
| 7,058,512 B2 | 6/2006 | Downton | |
| 7,066,280 B2 | 6/2006 | Sullivan et al. | |

(Continued)

FOREIGN PATENT DOCUMENTS

EP    1365103 A2    11/2003

(Continued)

OTHER PUBLICATIONS

Roger Schultz, Orlando De Jesus "Oilwell drillbit failure detection using remote acoustic sensing" May 2002, Proceedings of the American Control Conference, pp. 2603-2608.*

(Continued)

*Primary Examiner* — Cathleen Hutchins
(74) *Attorney, Agent, or Firm* — Cantor Colburn LLP

(57) ABSTRACT

A drill bit having a bit body includes one or more acoustic sensors that are configured to detect elastic waves when the drill bit is used for drilling a wellbore. The acoustic sensor may be configured to detect a sonic signature associated with a failure event. In further arrangements, the acoustic sensors may be configured to receive signals from a controlled acoustic source.

25 Claims, 3 Drawing Sheets

U.S. PATENT DOCUMENTS

| | | | |
|---|---|---|---|
| 7,207,215 | B2 | 4/2007 | Spross et al. |
| 7,278,499 | B2 | 10/2007 | Richert et al. |
| 7,308,937 | B2 | 12/2007 | Radford et al. |
| 7,350,568 | B2 | 4/2008 | Mandal et al. |
| 7,387,177 | B2 | 6/2008 | Zahradnik et al. |
| 7,497,276 | B2 | 3/2009 | Pastusek et al. |
| 7,506,695 | B2 | 3/2009 | Pastusek et al. |
| 7,510,026 | B2 | 3/2009 | Pastusek et al. |
| 2001/0042643 | A1 | 11/2001 | Krueger et al. |
| 2001/0054514 | A1 | 12/2001 | Sullivan et al. |
| 2004/0069539 | A1 | 4/2004 | Sullivan et al. |
| 2004/0222018 | A1 | 11/2004 | Sullivan et al. |
| 2005/0161258 | A1* | 7/2005 | Lockerd et al. ........... 175/45 |
| 2006/0175057 | A1* | 8/2006 | Mandal et al. ........... 166/254.2 |
| 2007/0114062 | A1* | 5/2007 | Hall et al. ........... 175/50 |
| 2007/0186639 | A1 | 8/2007 | Spross et al. |
| 2007/0272442 | A1 | 11/2007 | Pastusek et al. |
| 2008/0060848 | A1 | 3/2008 | Pastusek et al. |
| 2008/0065331 | A1 | 3/2008 | Pastusek et al. |
| 2008/0066959 | A1 | 3/2008 | Pastusek et al. |

FOREIGN PATENT DOCUMENTS

EP   1607571 A2   12/2005

OTHER PUBLICATIONS

Dateline Los Almos, a Monthly Publication of Los Almos National Laboratory, January Issue 1997, pp. 1-8.

Semiconductor-Based Radiation Detectors, http://sensors.lbl.gov/sn_semi.html, pp. 1-5.

NETL: Oil & Natural Gas Projects, Harsh-Environment Solid-State Gamma Detector for Down-hole Gas and Oil Exploration, http://xrfcorp.com/technology/about_czt_detectors.html, pp. 1-5.

NETL: Oil & Natural Gas Projects, Harsh-Environment Solid-State Gamma Detector for Down-hole Gas and Oil Exploration, http://www.netl.doe.gov/technologies/oil-gas/NaturalGas/Projects_n/..., pp. 1-5.

XRF Corporation, About CZT Detectors, http://xrfcorp.com/technology/about_czt_detectors.html, 1 sheet.

* cited by examiner

BIT BASED FORMATION EVALUATION AND DRILL BIT AND DRILL STRING ANALYSIS USING AN ACOUSTIC SENSOR

BACKGROUND INFORMATION

1. Field of the Disclosure

This disclosure relates generally to drill bits that include one or more acoustic sensors for providing measurements relating to the drill string and/or the formation.

2. Brief Description of the Related Art

Oil wells, or 'wellbores,' are usually drilled with a drill string that includes a tubular member having a drilling assembly (also referred to as the bottomhole assembly or "BHA"). The BHA includes devices and sensors for providing information about a variety of parameters relating to the drilling operations, behavior of the BHA and formation surrounding the wellbore being drilled. To optimize drilling, a driller may control certain drilling parameters such as weight on bit, drilling fluid flow through the drill pipe, drill string rotational speed and drilling mud characteristics. Since the lithology of the formation being drilled is a factor to consider in controlling these parameters, it is desirable to obtain lithological information during drilling. Also, wellbores often have complex three-dimensional trajectories that are designed to optimally intersect and drain one or more hydrocarbon reservoirs. Thus, it is also useful to have accurate information regarding the position or location of the BHA.

Therefore, there is a need for devices, systems and methods for evaluating formations during drilling of a wellbore and determining the position or location of the BHA.

SUMMARY

In one aspect, the present disclosure provides a drill bit having a bit body and an acoustic sensor in the bit body. The acoustic sensor may be configured to detect elastic waves when the drill bit is used for drilling a wellbore. In embodiments, a controller may be configured to process signals from the acoustic sensor. In one arrangement, the acoustic sensor may be configured to physically contact an earthen formation. Also, an acoustically transparent layer may separate the acoustic sensor and an earthen formation. The acoustic sensor may be positioned at in a cone of the drill bit; in a nose of the drill bit, and/or in a shoulder of the drill bit. Further, the acoustic sensor may be positioned behind a cutter configured to disintegrate an earthen formation. In embodiments, the acoustic sensor may be a passive acoustic sensor configured to detect a sonic signature associated with a failure event. In further arrangements, a controller operatively coupled to the acoustic sensor may be configured to receive signals from the acoustic sensor. In embodiments, a communication link may be coupled to the controller to transmit data and/or receive data from a remote device.

In another aspect, the present disclosure provides a making a drill bit. The method may include placing in a bit body of the drill bit one or more acoustic sensors configured to provide signals representative of an elastic wave when the drill bit is used for drilling a wellbore. The method may also include coupling a controller with the sensor, and configuring the controller to process the signals from the acoustic sensor. In embodiments, the method may further include programming the controller with a model that defines a relationship between the sensor signals and a failure event of the formation, a failure event of a cutter, and/or a failure event of the bit body. The acoustic sensor may detect a sonic signature associated with a failure event.

In aspects, the present disclosure provides a drilling system for use in drilling of a wellbore in an earth formation. The drilling system may include a drill bit having a bit body; and an acoustic sensor in the bit body configured to provide signals representative of an elastic wave weight when the drill bit is deployed in the wellbore. In arrangements, the system may include a controller. The controller may be programmed to perform one or more functions. In one arrangement, the controller processes signals from the acoustic sensor to detect a sonic signature associated with a failure event. The failure event may be a formation failure, a cutter failure, and/or a bit body failure. The controller may include a model that defines a relationship between the at least one acoustic sensor signals and a failure event of the formation, a failure event of a cutter, and/or a failure event of the bit body. In applications, a first frequency may be associated with a failure event of the bit body, and second frequency that is higher than the first frequency may be associated with the failure event of the formation, and a third frequency that is higher than the second frequency may be associated with a failure event of the cutter. In embodiments, the acoustic sensor may be a plurality of acoustic sensors, and the controller may be programmed to estimate a location of a detected failure event using the detected signals from the plurality of acoustic sensors. In embodiments, the acoustic source may be positioned distally from the drill bit, and the acoustic sensor may detect a signal from the acoustic source. In still other embodiments, the controller may process the detected signal from the acoustic source and determine a location parameter associated with the drill bit. In further arrangements, the system may include a drill string that conveys the drill bit into the wellbore, and the acoustic source may be acoustically coupled to the drill string. In arrangements, the acoustic source may be a plurality of acoustic sources. In embodiments, the controller processes the detected signals from the plurality of acoustic sources and estimates a location parameter associated with the drill bit. In still further embodiments, the controller may process the detected signal from the acoustic source and determine a rate of penetration (ROP).

Examples of certain features of the apparatus and method disclosed herein are summarized rather broadly in order that the detailed description thereof that follows may be better understood. There are, of course, additional features of the apparatus and method disclosed hereinafter that will form the subject of the claims appended hereto.

BRIEF DESCRIPTION OF THE DRAWINGS

For detailed understanding of the present disclosure, references should be made to the following detailed description, taken in conjunction with the accompanying drawings in which like elements have generally been designated with like numerals and wherein.

DETAILED DESCRIPTION

The present disclosure relates to devices and methods for obtaining information relating to the drill bit, the drill string, and the formation being drilled by the drill bit. The present disclosure is susceptible to embodiments of different forms. The drawings show and the written specification describes specific embodiments of the present disclosure with the understanding that the present disclosure is to be considered an exemplification of the principles of the disclosure, and is not intended to limit the disclosure to that illustrated and described herein.

Figure 1:
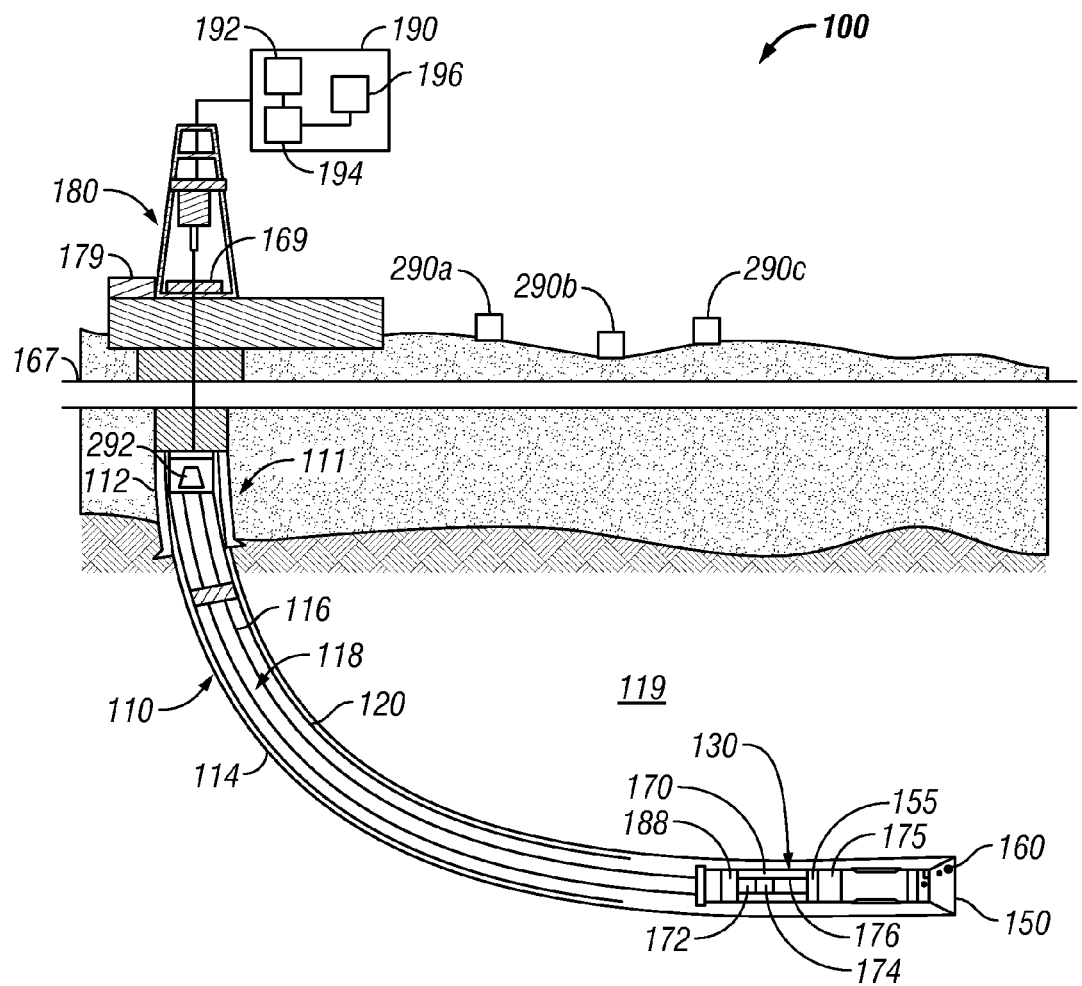
FIG. 1 is a schematic diagram of a drilling system that includes a drill string that has a drill bit made according to one embodiment of the disclosure for drilling wellbores.

FIG. 1 is a schematic diagram of an exemplary drilling system 100 that may utilize drill bits disclosed herein for drilling wellbores. FIG. 1 shows a wellbore 110 that includes an upper section 111 with a casing 112 installed therein and a lower section 114 that is being drilled with a drill string 118. The drill string 118 includes a tubular member 116 that carries a drilling assembly 130 (also referred to as the bottomhole assembly or "BHA") at its bottom end. The tubular member 116 may be made up by joining drill pipe sections or it may be coiled tubing. A drill bit 150 is attached to the bottom end of the BHA 130 for disintegrating the rock formation to drill the wellbore 112 of a selected diameter in the formation 119. Not shown are devices such as thrusters, stabilizers, centralizers, and devices such as steering units for steering the drilling assembly 130 in a desired direction. The terms wellbore and borehole are used herein as synonyms.

The drill string 118 is shown conveyed into the wellbore 110 from a rig 180 at the surface 167. The exemplary rig 180 shown in FIG. 1 is a land rig for ease of explanation. The apparatus and methods disclosed herein may also be utilized with an offshore rigs used for drilling wellbores under water. A rotary table 169 or a top drive (not shown) coupled to the drill string 118 may be utilized to rotate the drill string 118 at the surface to rotate the drilling assembly 130 and thus the drill bit 150 to drill the wellbore 110. A drilling motor 155 (also referred to as "mud motors") may also be provided to rotate the drill bit. A control unit (or controller) 190, which may be a computer-based unit, may be placed at the surface 167 for receiving and processing data transmitted by the sensors in the drill bit and other sensors in the drilling assembly 130 and for controlling selected operations of the various devices and sensors in the drilling assembly 130. The surface controller 190, in one embodiment, may include a processor 192, a data storage device (or a computer-readable medium) 194 for storing data and computer programs 196. The data storage device 194 may be any suitable device, including, but not limited to, a read-only memory (ROM), a random-access memory (RAM), a flash memory, a magnetic tape, a hard disc and an optical disk. To drill a wellbore, a drilling fluid from a source 179 is pumped under pressure into the tubular member 116. The drilling fluid discharges at the bottom of the drill bit 150 and returns to the surface via the annular space (also referred as the "annulus") between the drill string 118 and the inside wall of the wellbore 110.

Still referring to FIG. 1, the drill bit 150 includes one or more acoustic sensors 160 and related circuitry for estimating one or more parameters relating to a formation being drilled, the drill string 118 and/or the drill bit 150. The drilling assembly 130 may further include one or more downhole sensors (also referred to as the measurement-while-drilling (MWD) sensors (collectively designated by numeral 175) and at least one control unit (or controller) 170 for processing data received from the MWD sensors 175 and the drill bit 150. The controller 170 may include a processor 172, such as a microprocessor, a data storage device 174 and a program 176 for use by the processor to process downhole data and to communicate data with the surface controller 190 via a two-way telemetry unit 188. The telemetry unit 188 may utilize communication uplinks and downlinks. Exemplary communications may include mud pulse telemetry and data conductor (not shown) positioned along the drill string 118. The data conductors may include metal wires, fiber optical cables, or other suitable data carriers.

The MWD sensors 175 may includes sensors for measuring near-bit direction (e.g., BHA azimuth and inclination, BHA coordinates, etc.), dual rotary azimuthal acoustic, bore and annular pressure (flow-on & flow-off), temperature, vibration/dynamics, multiple propagation resistivity, and sensors and tools for making rotary directional surveys. Exemplary sensors may also include sensors for determining parameters of interest relating to the formation, borehole, geophysical characteristics, borehole fluids and boundary conditions. These sensor include formation evaluation sensors (e.g., resistivity, dielectric constant, water saturation, porosity, density and permeability), sensors for measuring borehole parameters (e.g., borehole size, and borehole roughness), sensors for measuring geophysical parameters (e.g., acoustic velocity and acoustic travel time), sensors for measuring borehole fluid parameters (e.g., viscosity, density, clarity, rheology, pH level, and gas, oil and water contents), and boundary condition sensors, sensors for measuring physical and chemical properties of the borehole fluid.

Figure 2:
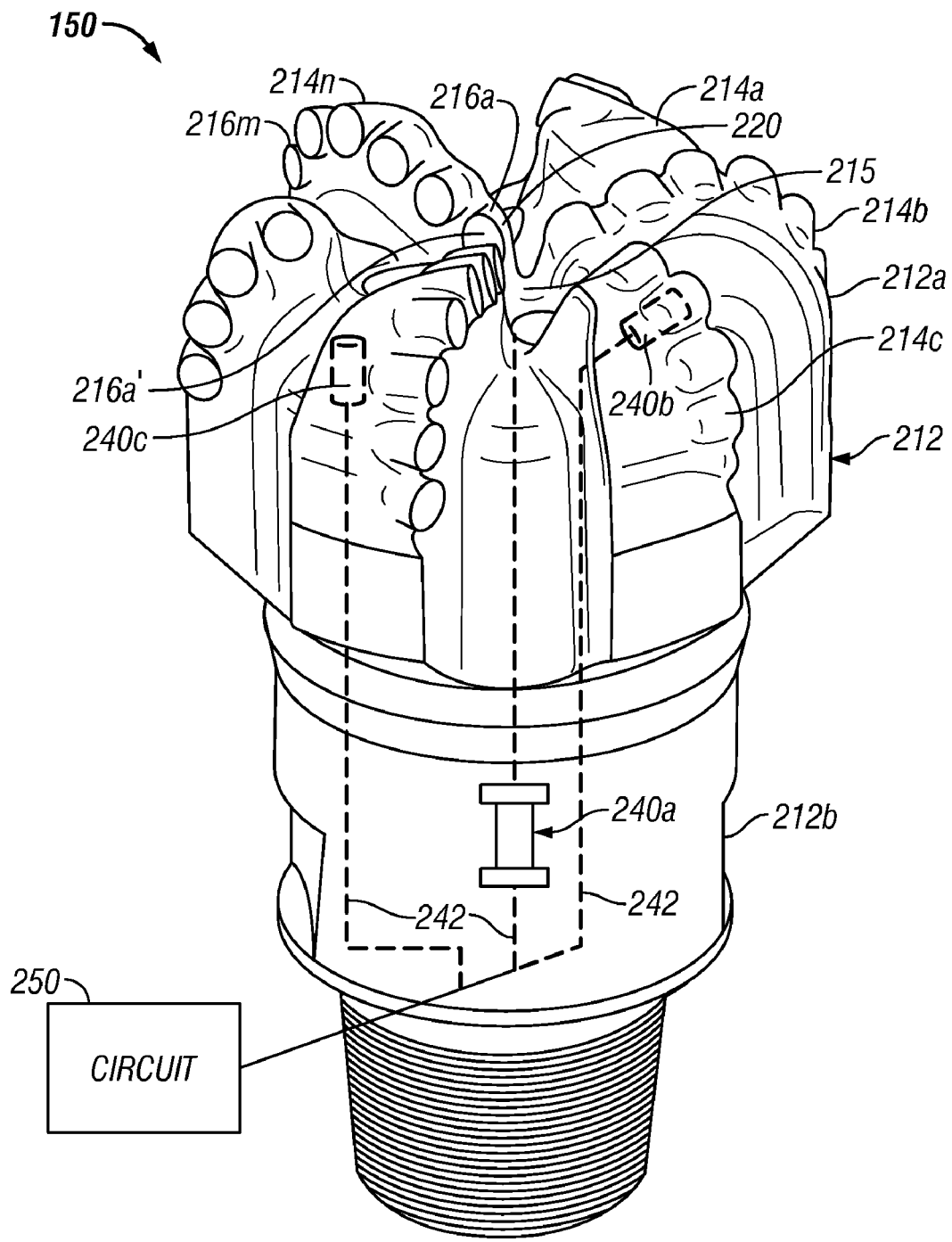
FIG. 2 is an isometric view of an exemplary drill bit showing placement of acoustic sensors in the drill bit and an electrical circuit for at least partial processing the signals generated by the acoustic sensor according to one embodiment of the disclosure.

FIG. 2 shows an isometric view of an exemplary drill bit 150 that includes an acoustic sensor 240 embedded therein according to one embodiment of the disclosure. The acoustic sensor 240 may be any sensor that generates a signal in response to applied acoustical energy. Illustrative acoustic sensors include acoustic wave sensors that utilize piezoelectric material, magneto-restrictive sensors, accelerometers, etc. A PDC drill bit is shown for explanation purposes. Any other type of drill bit may be utilized for the purpose of this disclosure. The drill bit 150 is shown to include a drill bit body 212 comprising a cone 212a and a shank 212b. The cone includes a number of blade profiles (or profiles) 214a, 214b, . . . 214n. A number of cutters are placed along each profile. For example, profile 214a is shown to contain cutters 216a-216m. All profiles are shown to terminate at the bottom of the drill bit 215. Each cutter has a cutting surface or cutting element, such as element 216a' of cutter 216a, that engages the rock formation when the drill bit 150 is rotated during drilling of the wellbore. Each cutter 216a-216m has a back rake angle and a side rake angle that defines the cut made by that cutter into the formation.

FIG. 2 illustrates a variety of positions or locations for the acoustic sensor 240. In one arrangement, an acoustic sensor 240a may be placed in the shank 212b. In another embodiment, an acoustic sensor 240b may be integrated into one or more of the cutters 216a-216m, or simply cutters 216. Also, such sensors may be placed at any suitable location in the drill bit 150, including but not limited to the crown 212a, such as acoustic sensor 240c. In one arrangement, the acoustic sensor may be configured to physically contact an earthen formation. That is, the acoustic sensor 240 may be configured to directly sense an acoustic wave in the formation without having that elastic wave travel first through the body of the drill bit. In such embodiments, an acoustically transparent layer (not shown), such as a synthetic diamond cutter, may separate the acoustic sensor 240 and an earthen formation to protect the acoustic sensor. Conductors 242 provide signals from the sensor 240 to a circuit 250 for processing such signals. The circuit 250 may be placed in the drill bit or outside the drill bit. A circuit 250 in the shank may be configured to condition, filter, amplify or otherwise process the signals from the acoustic sensor. Hereafter, for convenience, one or more of the acoustic sensors 240a,b,c, will be referred to as simply acoustic sensor 240.

In embodiments, the acoustic sensor 240 may be configured to detect elastic waves. The elastic waves may generated by the interaction of the drill bit 150 with the formation being drilled. The elastic waves may be characterized by a sonic signature that may be analyzed to estimate or determine whether one or more events are occurring in the drilled formation and/or in the drill bit. With respect to the formation, the event may be the fracturing of the rock and earth due to the cutting action of the cutter. With respect to the drill bit or cutter, the event may be the fracturing, cracking, snapping, or other types of failure of a particular element or component of the drill bit 150 or cutter. In one non-limiting application, the frequencies of the sonic signature may be analyzed to determine one or more characteristics of the formation or the drill bit. For instance, a relatively low frequency may be associated with a failure event of the bit body 150. An illustrative failure event may be a fracture in the metal of the bit body. A second higher frequency may be associated with the failure event of the formation, such as the fracture of the rock and earth being cut by the drill bit. A third still higher frequency may be associated with a failure event of the cutter 216 on the drill bit 150. For example, the diamond material of the cutter may crack. In embodiments, characteristics other than or in addition to frequency may be used to characterize or categorize the detected elastic waves.

In embodiments, a plurality of acoustic sensors 240 may be disposed on the drill bit 150. The plurality of acoustic sensors 240 may be spatially arrayed such that conventional triangulation techniques may be utilized to determine or estimate a location on the drill bit 150 from which a given elastic wave originated. As discussed previously, an elastic wave may have been generated by the failure of a cutter or the failure in a bit body. For instance, the fracture or failure of a cutter may generate a particular elastic wave. When a plurality of acoustic sensors 240, all of which are positioned at known locations, detect a particular elastic wave, then one or more characteristics of that detected elastic wave, such as time of detection, may be utilized to estimate a location for the detected event that generated that elastic wave.

In embodiments, the acoustic sensors 240 may be utilized to detect one or more controlled seismic signals. By controlled, it is meant that the seismic signal is generated by a device specifically configured to emit a sonic signal having one or more predetermined characteristics or parameters; e.g., frequency, source location, amplitude, pulse intervals, etc. For example, referring now to FIG. 1, one or more sources 290a,b,c may be positioned at or near the earth's surface at known locations. The sources 290a,b,c may transmit a seismic signal into the earth that is detected by one or more acoustic sensors 240 in the drill bit 150. The sensors 160 and 240 are generally the same sensors. The transmitted seismic signal may each have a uniquely identifiable characteristic and may be transmitted at the known times. Again, using known triangulation techniques, the three-dimensional position of the drill bit 150 may be estimated or determined by detecting and processing the seismic signals. Through periodic estimations of the location of the drill bit 150, the driller may develop a trajectory of the drill bit/drill string.

In another embodiment, a signal source 292 may be acoustically coupled to the drill string. The signal source 292 may on demand, continuously, or periodically transmits an acoustical signal along the drill string 118 that is detected by the bit-based acoustic sensor 240. An appropriately programmed processor may utilize information such as the acoustic impedance of the drill string 118 and time between signal transmission and signal reception to determine the distance traveled by the acoustic signal. This determined traveled distance may be corrected or adjusted as needed to arrive at an estimate of the length of the drill string 118.

In embodiments, the controller 170 may be configured to receive signals directly from the acoustic sensor 240 or via the circuit 250. For failure event analysis, the controller 170 may be programmed with a model that defines a relationship between detected sonic signatures and a failure event of the formation, a failure event of a cutter, and/or a failure event of the bit body. The controller 170 may be further programmed with models that may estimate a lithological characteristic of the formation based on one or more characteristics of the received sonic signature. That is, different types of rock generate different sonic signatures when failing. Thus, their unique sonic signatures may be utilized to identify the type of rock being drilled. To determine one or more location parameters, the controller 170 may be programmed with algorithms that perform triangulation analysis based on received sonic, seismic or acoustical signals. The controller 170 may utilize a clock that may or may not be synchronized with a surface clock or use any other suitable means to determine any relevant time values needed to process the signals provided by the acoustic sensor 240. The controller 170 may also be programmed with a parameter such as a preset interval between successive signals (e.g., ten seconds). In embodiments, a communication link may be coupled to the controller 170 to transmit data and/or receive data from a remote device that is uphole in the wellbore or at the surface. Of course, the surface controller 40 may also be configured in a similar manner.

Figure 3:
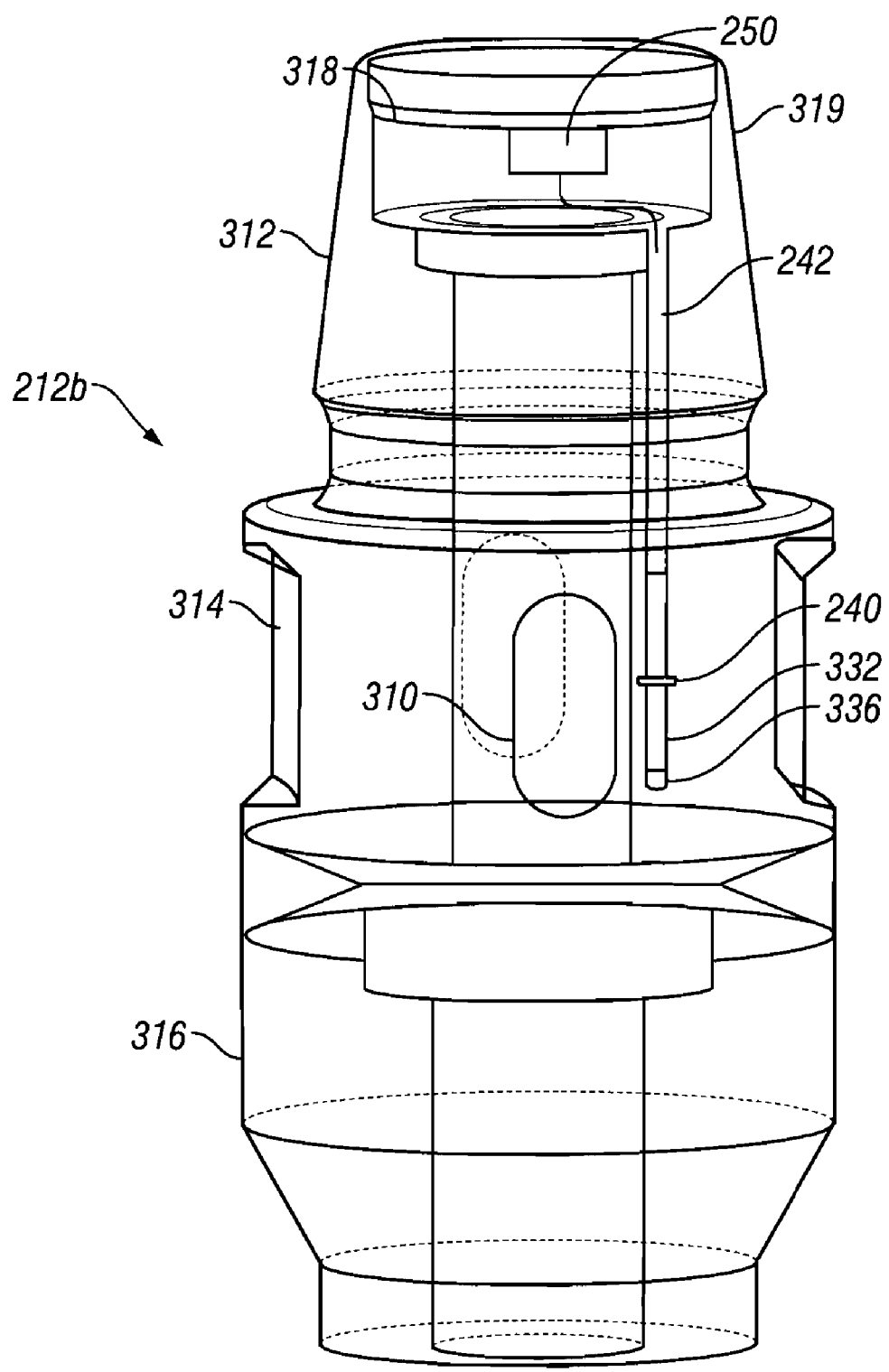
FIG. 3 shows the placement of the acoustic sensor in the shank of an exemplary drill bit according to one embodiment of the disclosure.

FIG. 3 shows certain details of the shank 212b according to one embodiment of the disclosure. The shank 212b includes a bore 310 therethrough for supplying drilling fluid to the cone 212a of the drill bit 150 and one or more circular sections surrounding the bore 310, such as sections 312, 314 and 316. The upper end of the shank 212b includes a recessed area 318. Threads 319 on the neck section 312 connect the drill bit 150 to the drilling assembly 130. The sensor 240 containing the acoustic sensor 332 may be placed at any suitable location in the shank. In one aspect, the sensor 240 may be placed in a recess 336 in section 314 of the shank. Conductors 242 may be run from the sensors 332 to an electric circuit 250 in the recess 318. The circuit 250 may be coupled to the downhole controller 170 (FIG. 1) by conductors that run from the circuit 250 to the controller 170. In one aspect, the circuit 250 may include an amplifier that amplifies the signals from the sensors 332 and an analog-to-digital (A/D) converter that digitizes the amplified signals. In another aspect, the sensor signals may be digitized without prior amplification. It should be appreciated that all of the components of the sensor 240 may co-located or may separately located. That is, the sensing elements may be positioned at a cutter, such as cutter 216a, and the signal conditioning elements may be positioned in the shank 212b. The sensor 240 may be positioned at a surface of the bit body 150.

Referring to FIGS. 1-3, in one mode of operation, the controller 170 and/or surface controller 40 estimate a lithological characteristic based on detected elastic waves associated with failure events in the formation. The signals from the sensors 240 may be sent to the controller 170 to determine their sonic signature. In certain embodiments, the controller 170 may operate autonomously. In other embodiments, the controller 170 may perform certain pre-processing and send the processed data to the surface controller 40 for further processing and subsequent action. In either case, the controller 170 and/or controller 40 may process such signals to estimate a lithological characteristic based on their determined sonic signatures. For instance, the detected sonic signature may be compared or correlated with the sonic signatures from reference formations having a known lithology. This comparison or correlation may be used to estimate or predict the lithology of the formation being drilled. The lithological information may be recorded to memory. Also, the downhole controller 170 and/or the surface controller 40 may utilize this lithological information to initiate one or more changes, including, but not limited to, altering weight-on-bit, rotational speed of the drill bit, and the rate of the fluid flow so as to increase the efficiency of the drilling operations and extend the life of the drill bit 150 and drilling assembly 130.

In another mode of operation, the controller 170 and/or surface controller 40 evaluate failure events associated with the drill bit 150 or one or more cutters 216 using the detected elastic waves. The controllers 170, 40 may characterize the sonic signature associated with the detected elastic waves with respect to frequency as previously discussed. Thus, a relatively low frequency may be associated with a failure event of the bit body and a relatively high frequency may be associated with a failure event of the cutter. The failure event may be recorded to a memory device for later analysis or evaluation. Also the controllers 170, 40 may be programmed to take one or more specified actions in response to a given detected sonic signature. For instance, the controller 170, 40 may respond to a particular sonic signature indicative of a catastrophic failure of the drill bit 150 by sending an alarm signal. Thus, the sonic signatures and associated failure events may be utilized to develop a historical database for the drill bit 150 recording failure events, condition, wear, tear, behavior, etc. and to also optimize or control drilling activity. This database may be used to evaluate the effectiveness of the drill bit 150 in various formations, determine remaining service life, perform necessary refurbishment, etc. In embodiments where a plurality of acoustic sensors 240 are disposed on the drill bit 140, conventional triangulation techniques may be utilized to determine or estimate a location of the failure events on the drill bit 140.

In another mode of operation, the sensor 240 may be utilized to determine one or more location parameters for the drilling assembly 130. The term location parameter generally encompasses quantities or values that may be used to characterize the position or orientation of the drilling assembly 130 with respect to a give reference frame. Illustrative location parameters include x,y,z coordinates, polar coordinates, azimuth, inclination, deviation from magnetic north or gravitation north, etc.

In an illustrative mode of operation, the sources 290a,b,c positioned at or near the earth's surface at known locations may be periodically energized or activated. When energized, the sources 290a,b,c transmit a seismic signal into the earth that is detected by one or more acoustic sensors 240 in the drill bit 150. The transmitted seismic signal may each have a uniquely identifiable characteristic and may be transmitted at known times. In response to the detected seismic signals, the acoustic sensors 240 transmit signals via the circuit 250 to the controller 170. The controller 170 may be programmed with relevant data such as the position of the sources 290a,b,c and time parameters for the transmitted and received seismic signals. Using known triangulation techniques, a suitably programmed computer, e.g., the controller 170, may estimate or determine one or more location parameters for the drill string and/or drill bit. The location parameter may be the three-dimensional position of the drill bit and/or the true vertical depth of the drill bit. Over time, the processor 170 may estimate or determine the trajectory of the drill bit/drill string as position data is accumulated. The data may also be sent to the surface controller 40 for such processing.

In still another mode of operation, the measured depth of the drill string 118 may be estimated periodically or on-demand. For example, the signal source 292 acoustically coupled to the drill string may be energized to transmit an acoustical signal along the drill string 118. One or more of the bit-based acoustic sensor 240 may detect the transmitted signal and send a responsive signal to the processor 170. Either the downhole processor 170 or the surface processor 40 may utilize data such as the time interval between signal transmission and signal detection and the known physical characteristics of the drill string (e.g., acoustic impedance) to estimate the measured depth of the wellbore. Also, based on the determined location parameters, other drilling parameters such as rate of penetration may also be estimated or determined.

From the above, it should be appreciated that what has been disclosed includes one or more acoustic sensors in a body of the drill bit. The acoustic sensor may be configured to detect elastic waves when the drill bit is used for drilling a wellbore. In embodiments, the acoustic sensor may be a passive acoustic sensor configured to detect elastic waves that are associated with a failure event and have a discernable sonic signature. In further arrangements, a controller operatively coupled to the acoustic sensor may be configured to receive signals from the acoustic sensor. Additionally, it should be appreciated that what has been disclosed includes programming the controller with a model that defines a relationship between the sensor signals and a failure event of the formation, a failure event of a cutter, and/or a failure event of the bit body.

From the above, it should be appreciated that what has been disclosed further includes a drilling system that includes an acoustic sensor in a bit body configured to provide signals representative of a detected elastic wave. A controller may be programmed to processes signals from the acoustic sensor to determine a sonic signature associated with a failure event. In applications, a first frequency may be associated with a failure event of the bit body, and second frequency that is higher than the first frequency may be associated with the failure event of the formation, and a third frequency that is higher than the second frequency may be associated with a failure event of the cutter. In embodiments, the acoustic sensor may be a plurality of acoustic sensors, and the controller may be programmed to estimate a location of a detected failure event using the detected signals from the plurality of acoustic sensors. In embodiments, one or more acoustic sources may be positioned distally from the drill bit, and the acoustic sensor may detect a signal from the acoustic source. The controller may process the detected signal from the acoustic source and determine a location parameter associated with the drill bit. The system may include a drill string that conveys the drill bit into the wellbore, and the acoustic source may be acoustically coupled to the drill string. In still further embodiments, the controller may process the detected signal from the acoustic source and determine a rate of penetration (ROP).

The foregoing description is directed to particular embodiments for the purpose of illustration and explanation. It will be apparent, however, to persons skilled in the art that many modifications and changes to the embodiments set forth above may be made without departing from the scope and spirit of the concepts and embodiments disclosed herein. It is intended that the following claims be interpreted to embrace all such modifications and changes.

What is claimed is:
1. A drill bit, comprising:
   a bit body including a crown portion and a shank portion, the crown portion including a cutter; and
   an acoustic sensor integrated in the cutter or inside the shank portion of the bit body configured to detect elastic waves generated by interaction of the drill bit with a formation during drilling, wherein the acoustic sensor is configured to detect sonic signatures associated with failure events for the drill bit and the formation.

2. The drill bit of claim 1, further comprising a controller configured to process signals from the acoustic sensor.

3. The drill bit of claim 1, wherein the acoustic sensor is configured to physically contact the formation.

4. The drill bit of claim 1, further comprising an acoustically transparent layer separating the acoustic sensor and the formation.

5. The drill bit of claim 1, wherein the acoustic sensor is positioned at one selected from the group consisting of: (i) a cone of the drill bit; (ii) a nose of the drill bit, and (iii) a shoulder of the drill bit.

6. The drill bit of claim 1, wherein the acoustic sensor is positioned behind a cutter configured to disintegrate the the formation.

7. The drill bit of claim 1, wherein the acoustic sensor is a passive acoustic sensor configured to detect sonic signatures associated with failure events.

8. The drill bit of claim 1, further comprising a controller operatively coupled to the acoustic sensor, the controller being configured to receive signals from the acoustic sensor.

9. The drill bit of claim 8, further comprising a communication link coupled to the controller, the communication link being configured to perform one selected from the group consisting of (i) transmit data to, and (ii) receive data from a remote device.

10. A method of making a drill bit, comprising:
placing in a crown portion or a shank portion of a bit body of the drill bit at least one acoustic sensor configured to provide signals representative of an elastic wave generated by interaction of the drill bit with a formation during drilling, wherein the at least one acoustic sensor is configured to detect sonic signatures associated with failure events for the drill bit and the formation, wherein the acoustic sensor is integrated in a cutter of the crown portion or is located inside the shank portion.

11. The method of claim 10, further comprising coupling a controller with the at least one acoustic sensor, and configuring the controller to process the signals from the at least one acoustic sensor.

12. The method of claim 11, further comprising programming the controller with a model that defines a relationship between the signals and one selected from the group consisting of (i) a failure event of the formation, (ii) a failure event of a cutter, and (iii) a failure event of the bit body.

13. The method of claim 10, wherein the at least one acoustic sensor is embedded in a crown portion of the bit body.

14. A drilling system for use in drilling of a wellbore in an earth formation, comprising:

a drill bit having a bit body including a crown portion and a shank portion, the crown portion including a cutter; and at least one acoustic sensor integrated in the cutter or the inside the shank portion of the bit body configured to provide signals representative of an elastic wave weight wherein the elastic wave is generated by interaction of the drill bit with a formation during drilling.

15. The drilling assembly of claim 14, further comprising a controller configured to process signals from the at least one acoustic sensor to detect a sonic signature associated with a failure event.

16. The drilling assembly of claim 15, wherein the failure event is one selected from the group consisting of: (i) a formation failure, (ii) a cutter failure, and (iii) a bit body failure.

17. The drilling assembly of claim 14, wherein the controller includes a model that defines a relationship between the signals and one selected from the group consisting of (i) a failure event of the formation, (ii) a failure event of a cutter, and (iii) a failure event of the bit body.

18. The drilling assembly of claim 17, wherein a first frequency is associated with a failure event of the bit body, and second frequency that is higher than the first frequency is associated with the failure event of the formation, and a third frequency that is higher than the second frequency is associated with a failure event of the cutter.

19. The drilling assembly of claim 14, wherein the at least one acoustic sensor comprises a plurality of acoustic sensors, and wherein the controller is programmed to estimate a location of a detected failure event using the detected signals from the plurality of acoustic sensors.

20. The drilling assembly of claim 14, further comprising at least one acoustic source positioned distally from the drill bit, the at least one acoustic sensor being configured to detect a signal from the acoustic source.

21. The drilling assembly of claim 20, further comprising a controller configured to process the detected signal from the acoustic source and determine a location parameter associated with the drill bit.

22. The drilling assembly of claim 20, further comprising a drill string configured to convey the drill bit into the wellbore, and wherein the at least one acoustic source is acoustically coupled to the drill string.

23. The drilling assembly of claim 19, wherein the at least one acoustic source comprises a plurality of acoustic sources.

24. The drilling assembly of claim 23, further comprising a controller configured to process the detected signals from the plurality of acoustic sources and estimate a location parameter associated with the drill bit.

25. The drilling assembly of claim 20, further comprising a controller configured to process the detected signal from the acoustic source and determine a rate of penetration (ROP).

* * * * *